Patented Aug. 27, 1929.

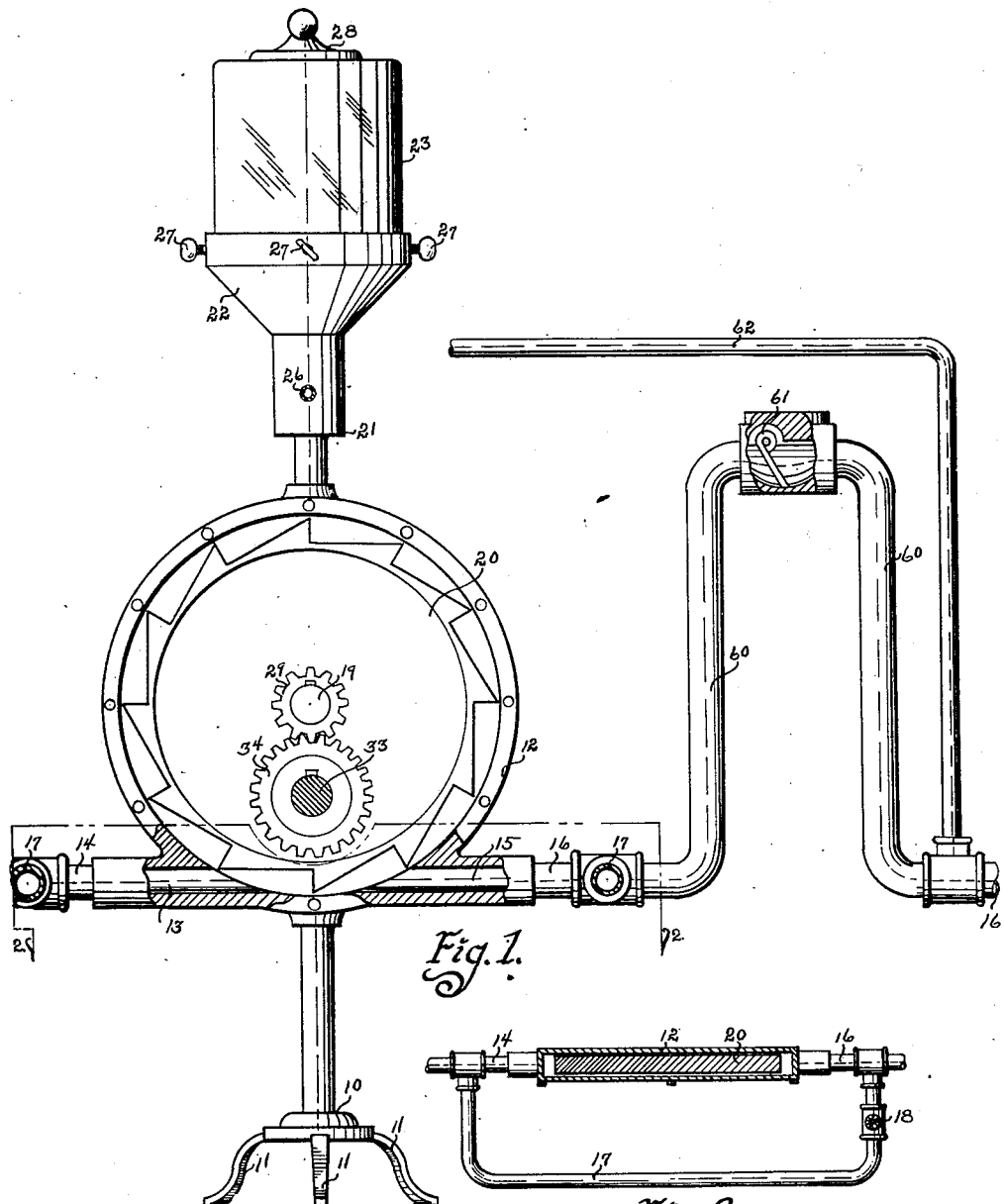

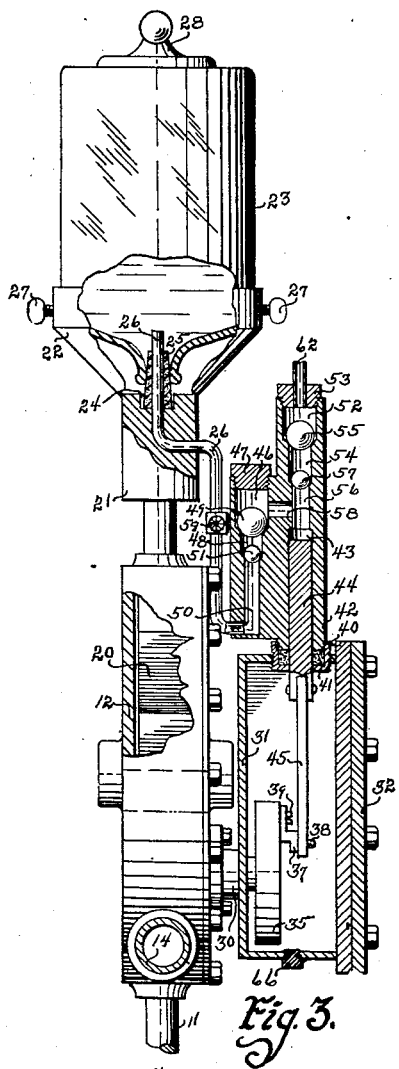
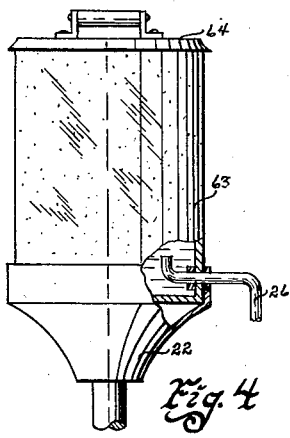
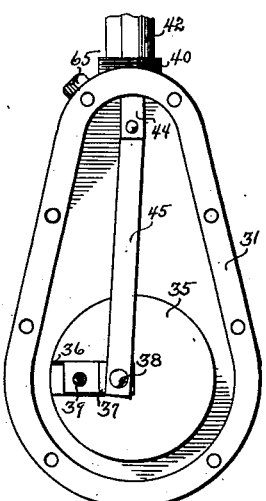
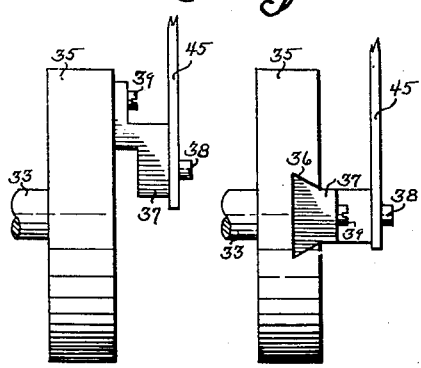

1,726,083

UNITED STATES PATENT OFFICE.

WILSON L. McLAUGHLIN AND HERROLD L. McLAUGHLIN, OF DES MOINES, IOWA.

WATER-SOFTENER MACHINE.

Application filed August 13, 1928. Serial No. 299,259.

The principal object of this invention is to provide a water softener machine that may be secured in any pipe line that has water passing through it under pressure for operating the device.

A further object of this invention is to provide a water softener machine that may be easily adjusted relative to the amount of softening liquid to be injected into a given quantity of water.

A still further object of this invention is to provide a water softener machine that may be quickly adjusted relative to the speed of its water motor to the amount of water passing through the pipe to be softened.

A still further object of this invention is to provide a water softener machine operated by the water passing through the same that prevents any of the water softened by the device from returning back into the water motor mechanism.

A still further object of this invention is to provide a water softener machine that is so constructed that undesirable leakage of either the water or the water softening solution is eliminated.

A still further object of this invention is to provide a water softener machine that is easily replenished with the water softening solution when the same has become depleted.

A still further object of our invention is to provide a device for the softening of water that is economical in manufacture and durable in use.

These and other objects will be apparent to those skilled in the art.

Our invention consists in the construction, arrangement and combination of the various parts of the device, whereby the objects contemplated are attained as hereinafter more fully set forth, pointed out in our claims and illustrated in the accompanying drawings, in which:

Fig. 1 is a side sectional view of our invention showing the construction of the water motor mechanism.

Fig. 2 is a top plan view of a portion of the device taken on line 2—2 of Fig. 1 and shows a bypass for adjustably diverting a certain proportion of the water from passing through the water motor.

Fig. 3 is an end sectional view of a part of the invention and more fully illustrates its interior construction.

Fig. 4 is a modified form of structure of a water softening solution supply tank that may be used with our device.

Fig. 5 is a front view of the piston actuating mechanism in its housing with the cover plate of the housing removed.

Fig. 6 is a side view of the piston actuating wheel and crank in one position of its rotation.

Fig. 7 is also a side view of the piston actuating wheel and crank but in another position of its rotation.

The chief disadvantage of water softening machines now being sold to the general public is their lack of minute adjustment both as to the amount of water softening solution injected into the water to be softened and the speed of the water motor relative to the amount of water passing through the pipe to be softened. Other disadvantages are complicated construction, leakage and manufacturing cost.

We have overcome these disadvantages as will be apparent to those skilled in the art.

We have designated the base portion of the device by the numeral 10 which is in turn supported by three legs 11. Mounted on this base or stand 10 is the impeller housing 12 having the inlet opening 13 in one side and designed to communicate with the water pipe line 14. On the opposite side of this housing is the outlet opening 15 communicating with the outlet water pipe 16. The numeral 17 designates a pipe having one end communicating with the pipe 14 and its other end communicating with the pipe 16, as shown in Fig. 2. Mounted in this pipe 17 is the ordinary globe valve 18 capable of manual adjustment. Journaled in the housing 12, as shown in Fig. 1, is the impeller shaft 19. Inside the housing 12 and secured to the shaft 19 against relative movement thereto is the impeller 20 having one face of each of its teeth in a radial plane with the shaft 19 and the other face of each of its teeth extending in a direct line to the next tooth adjacent to it, as shown in Fig. 1. By this construction, when water is flowing through the device the impeller will be rotated but due to the construction of its teeth little if any water will be carried around with the impeller. Secured to and supported on top of the housing 12 is the bearing member 21 having the hollow inverted cone-shaped member 22 formed on its top.

Resting in an inverted position in the member 22 is the glass jar 23. Extending into the mouth of this jar 23 and resting on the bottom of the well 24 in the bearing member 21 is the cork 25. Having one end passing through this cork 25 and terminating inside the jar 23 and its other end passing through the bearing member 21 is the water softening solution pipe 26. The numeral 27 designates set screws threaded into the side of the member 22 and capable of engaging the jar 23 for securely holding the jar in its proper position in the inverted cone-shaped member 22. As this jar is constructed of glass, ascertainment as to the amount of the water softening solution in the same may be visibly attained. When the supply jar 23 becomes depleted of the water softening solution it is merely necessary to remove the lid 28 and place a new supply in the jar 23. This lid rests loosely over the opening in the bottom of the jar 23 and thereby allows sufficient air to pass into the jar 23 to prevent a vacuum being created in the jar as the water softening solution is used up by the device.

Secured by suitable means on the shaft 19 is the small spur gear 29. Permanently secured on the lower portion of the impeller housing 12 by bolts or the like is the bearing member 30. Integrally formed on this bearing member 30 is the cup-shaped housing 31 having the inclosing cover plate 32 detachably secured to the housing 31 by suitable means. Rotatably mounted in the bearing member 30 and having one end extending into the impeller housing 12 and its other end extending into the housing 31 is the shaft 33. Inside the impeller housing, permanently secured on the shaft 33 and in engagement with the small spur gear 29 is the comparatively large spur gear 34. Inside the housing 31 and permanently secured on the shaft 33 is the wheel 35 having the radial extending dove tailed groove 36.

Having one end slidably mounted in the groove 36 is the crank arm 37 carrying the axle 38. This crank arm may be adjustably secured and held in any position in the slot 36, by tightening the set screw 39. Threaded in the top portion of the housing 31 is the gland nut 40 having the packing 41. Threaded into this nut 40 and engaging the packing 41 is the cylinder block 42 having the piston bore 43. Slidably mounted in the bore 43 and extending into the housing 31 is the piston 44. Having one end hinged to the end of the piston 44 that is inside the housing 41 and its other end engaging the axle 38 is the connecting arm 45.

Extending into the top of the cylinder block 42 is the well 46 closed at its top by the plug 47 threaded into the same. Communicating with the bottom of the well 46 and of less diameter than the diameter of the well 46 is the vertical passageway 48 thereby providing the valve seat for the large ball valve 49. The numeral 50 designates the vertical passageway in the cylinder block 42 having one end communicating with the passageway 48 and its other end communicating with the water softening solution pipe 26 and of less diameter than the diameter of the passageway 48, thereby providing the valve seat for the small ball valve 51. Directly above the bore 43 and in the cylinder block 42 is the well 52 closed at its top by the plug 53 threaded into the same. Communicating with the bottom of the well 52 is the passageway 54 having a diameter less than the diameter of the well 52 thereby providing the valve seat for the ball valve 55. Having one end communicating with the bore 43 and its other end communicating with the passageway 54 is the vertical passageway 56 having a diameter less than the diameter of the passageway 54 thereby providing the valve seat for the ball valve 57.

The numeral 58 designates a horizontal passageway having one end communicating with the well 46 at a point above the ball valve 49 and its other end communicating with the passageway 56 at a point below the ball valve 57. The numeral 59 designates the ordinary manually operated valve in the pipe 26. The numeral 60 designates an upright U-shaped bend in the pipe 16. Located in the top portion of the U-shaped bend 60 is the ordinary one-way valve 61. The numeral 62 designates a pipe having one end communicating with the inside of the pipe 16 at a point below the U-shaped bend 60 and its other end communicating with the well 52 by passing through the plug 53, as shown in Fig. 3.

By the foregoing described construction, when water is passing through the impeller housing the impeller will be rotated which in turn will reciprocate the piston 44. When the piston 44 is traveling downward, its suction action and the force of gravity will cause the water softening solution in the jar 23 to pass through the pipe 26 into the passageway 50, up past the ball valve 51 into the passageway 48, past the ball valve 49 and into the well 46. From the well 46 the fluid will pass through the passageway 58 and into the passageway 56 and the bore 43. When the piston is forced upwardly by the rotation of the wheel 35 the ball valves 51 and 59 will be closed and the water softening solution will be forced up past the ball valve 57 into the passageway 54, past the ball valve 55 and into the well 52 from which it will pass through the pipe 62 into the pipe 16.

By adjusting the crank arm 37 in the slot 36 any desired length of travel of the piston 44 may be had, thereby obtaining any desired relative amount of water softening solution to the water to be softened.

After this desired adjustment is obtained the cover plate 32 is replaced and as the lower end of the piston 44 and gland nut 40 are inside the housing 31 all leakage from this portion of the device, which by the way is the only troublesome point, must pass into the housing 31 which will catch it and hold it against undesired leakage outside of the machine. However, this leakage to the inside of the housing 31 may be completely eliminated by filling the housing 31 approximately full of oil. When this procedure is adapted the filling opening in the top portion of the housing 31 is opened by removing the threaded plug 65 and the necessary oil placed in the housing after which the plug is replaced. If it becomes necessary to remove the cover plate 32 from the housing 31 for the adjustment of travel of the piston this oil should first be drained out of the housing by removing the plug 66.

When it is desired to adjust the speed of the impeller 20 relative to the amount of water passing through the pipe to be softened it is merely necessary to open or close the valve 18 thereby allowing any desired amount of water to be bypassed around the impeller housing 12 and through the pipe 17 instead of passing through the impeller housing 12 where it would ordinarily rotate the impeller 20. By this construction the speed of the water motor may be definitely fixed.

If it is desired to reduce or completely cut off the water softening solution passing through the pipe 26 it is merely necessary to operate the hand valve 59.

By the use of the three legs 11 for supporting the device the machine will rest properly and firmly on any uneven supporting surface. This is very advantageous as many basement floors are uneven.

In Fig. 4 we have shown a modified form of structure of a supply tank. In this view the inverted, hollow cone-shaped member 22 supports the ordinary crockery jar 63 having the usual lid 64. In this construction the pipe 26 passes into the lower portion of the jar 63 as shown in the drawings. Any suitable means may be provided for preventing leakage between the pipe 26 and the hole in the jar 63 through which it passes.

In either construction it will be noted that the water softening solution supply tank or jar is supported on top of the impeller housing thereby making for a very rigid and compact construction.

When oil is placed in the housing 31 it not only prevents the leakage of the pump mechanism back into the same but all of the mechanism is automatically oiled that is inside or communicating with the inside of the housing 31.

Additional rigidity of construction is obtained by securing the cylinder block on the impeller housing. When such a construction is used undesirable vibration is eliminated.

The U-shaped bend 60 prevents any water that has been softened to return back through the housing 12 into the pipe 14. This bend is aided in its purpose by the one-way valve 61.

It will readily be seen that we have not only provided a water softening machine that is under the control of the operator at all times, but one that is durable in use and refined in appearance.

Some changes may be made in the construction and arrangement of our improved water softener machine, without departing from the real spirit and purpose of our invention and it is our intention to cover by our claims any modified forms of structure or use of mechanical equivalents which may be reasonably included within their scope.

We claim:

1. In a device of the class described, an impeller housing, inlet and outlet ports in said housing, an impeller rotatably mounted in said housing, a second housing rigidly secured to said impeller housing, a cylinder block rigidly secured to said second housing, a bore in said cylinder block, a piston slidably mounted in said bore and extending into said second housing, a liquid supply tank communicating with said bore, an outlet pipe leading from said bore, and a means inside said second housing for operatively connecting said piston to said impeller.

2. In a device of the class described, an impeller housing, having inlet and outlet ports, a shaft rotatably mounted in said housing, an impeller secured on said shaft, a pinion secured on said shaft, a second housing rigidly secured to said impeller housing, a second shaft rotatably mounted in said first and second housings, a comparatively large pinion in said impeller housing, secured on said second shaft and in operative engagement with the said first mentioned pinion, a gland nut threaded into said second housing, a cylinder block threaded into said nut having a bore, an inlet and outlet passageway communicating with said bore, a piston slidably mounted in said bore and extending into said second housing, and a means for operatively connecting said piston to said second shaft.

3. In a device of the class described, an impeller housing, inlet and outlet ports in said housing, a shaft rotatably mounted in said housing, an impeller in said housing and on said shaft, a pinion in said housing and on said shaft, a bearing member secured on said housing, a second housing integrally formed on said bearing member, a second shaft rotatably mounted in said bearing member having one end in said impeller housing and its other end in said second housing, a pinion on said second shaft and in engagement with said first mentioned pinion, a wheel in said second housing and on said second shaft, a crank arm secured on said wheel, a cylinder block rigidly secured on the top portion of said second housing; said block having a bore with inlet and outlet ports, a piston slidably mounted in said bore and extending into said housing, and a connecting arm between said piston and said crank arm.

4. In a device of the class described, an impeller housing, an inlet and an outlet pipe communicating with the inside of said housing, an impeller rotatably mounted in said housing, a second housing rigidly secured to said impeller housing, a shaft rotatably mounted in the two sides of the two housings adjacent each other respectively, a chain of gears for operatively connecting said impeller to said shaft, a wheel in said second housing and on said shaft, a radially adjustable crank arm on said wheel, a pump operatively connected to said crank arm, and a detachable cover lid on said second housing.

5. In a device of the class described, a water motor having a shaft, a wheel designed to be rotated by said shaft, a radial dovetailed groove in the face of said wheel, a crank arm slidably mounted in said groove, a cylinder block having a bore, a supply tank, a pipe leading from said supply tank to said bore, a one-way valve in said pipe, an outlet pipe designed to lead to the water to be softened, and a piston slidably mounted in said bore and having one of its ends designed to be in engagement with said crank arm.

6. In a device of the class described, a water motor having a shaft, a wheel designed to be rotated by said shaft, a radial dovetailed groove in the face of said wheel, a projecting member slidably mounted in said groove, a means for preventing the sliding movement of said projecting member in said groove, a cylinder block having a bore, a supply tank, a pipe leading from said supply tank to said bore, a one-way valve in said pipe, an outlet pipe leading from said bore to the water designed to be softened, a one-way valve in said last mentioned pipe, a piston slidably mounted in said bore, and a connecting arm operatively connecting said piston with said projecting member.

7. In a device of the class described, an impeller housing, an impeller in said housing, a base member for supporting said impeller housing, a bearing member secured on the top of said housing, a jar supporting member secured to said bearing member, a transparent supply jar resting on said jar supporting member, a cylinder block secured to said housing, a piston bore in said cylinder block, a pipe leading from said supply jar to said bore, an outlet pipe leading from said bore, a piston slidably mounted in said bore and a means for operatively connecting said piston to said impeller.

8. In a device of the class described, an impeller housing, an impeller in said housing, a second housing secured on said first housing and designed to be filled with oil, a shaft rotatably mounted in said second housing, a chain of gears for operatively connecting said impeller with said shaft, a cylinder block mounted on said second housing, a supply tank, a bore in said cylinder block, a pipe leading from said supply tank to said bore, an outlet pipe, a piston slidably mounted in said bore, a wheel on said shaft and inside said second housing and a means for operatively connecting said piston with said wheel.

9. In a device of the class described, an impeller housing, an impeller rotatably mounted in said housing, a base member secured on the top of said housing, a hollow cone-shaped member integrally formed on the top portion of said base member, an inverted jar resting in said cone-shaped member, set screws threaded into the side of said cone-shaped member and engaging said jar, a well in the top of said base member adjacent the mouth of said jar, a cylinder block secured to said impeller housing, a bore in said cylinder block, a resilient member having one end engaging the said well and its other end entering the mouth of said jar, a pipe extending through said resilient member having one end terminating inside said jar and its other end communicating with said bore, an outlet pipe leading from said bore, a piston slidably mounted in said bore, and a means for operatively connecting said piston to said impeller.

WILSON L. McLAUGHLIN.
HERROLD L. McLAUGHLIN.